Patented Feb. 25, 1941

2,233,179

UNITED STATES PATENT OFFICE 2,233,179

MARGARINE

Herbert E. Otting, Westerville, and Lewis Chrysler, Columbus, Ohio, assignors to M & R Dietetic Laboratories, Inc., a corporation of Ohio No Drawing. Application January 6, 1939, Serial No. 249,564

13 Claims. (Cl. 99—123)

This invention relates to improvements in oleomargarine or margarine and the manufacture thereof and will be fully understood from the following description thereof.

In the manufacture of oleomargarine, in order to secure the desired emulsion characteristics and at the same time, the desired butter flavor, it has heretofore been regarded as necessary to emulsify or incorporate in the fatty constituents thereof a soured or "cultured" milk, usually produced by the action of cultures of lactic acid bacteria upon milk products such as whole milk, skim milk or (rarely) cream, together with salt.

In the effort to secure the desired butter-like flavor and aroma characteristic of margarine, the general trade practice has been to incorporate substantial proportions of salt together with the "cultured" milk, the proportions ranging from 3.5 to 5% on the product. These proportions are higher than those generally employed in butter manufacture, but have been found to be necessary, in combination with the soured or "cultured" milk, in order to secure the type of flavor and aroma characteristic of butter.

Attempts have also been made to improve the aroma and flavor of margarines containing "cultured" milk by the incorporation therein of artificial butter flavors, but these attempts have not been successful.

In accordance with our present invention, we have produced a margarine having the desired and characteristic butter flavor in which the flavor and aroma characteristics are independent of the presence of products of soured or cultured milk products containing lactic acid and of salt, and hence in which the soured milk products may be diminished in proportion or preferably eliminated, and the salt proportion may be reduced, say to 3% or lower, or even eliminated to produce a "sweet" margarine. We have found that by thus reducing and, preferably, eliminating the presence of lactic acid in margarine and by reducing the quantity of salt normally present therein, we are enabled, in accordance with our invention, to obtain margarines having present therein the desired flavors in stabilized form.

In carrying out the present invention, we incorporate in the emulsified fat or margarine, preferably without using soured or cultured or other lactic-acid-containing milk other than that normally contained in fresh uncultured skim or whole milk, the flavoring materials derived by lipolysis of butter fat and described in the patent of one of us, No. 1,966,460, granted July 17, 1934, and in the application of one of us, Serial No. 223,121, filed August 4, 1938.

The flavoring material produced in accordance with the aforesaid Patent No. 1,966,460 is a lipolyzed butter-fat-containing material such as whole milk or preferably a more concentrated butter-fat-containing material such as cream which has present therein both its preferentially oil-soluble free fatty acids and preferentially water-soluble free fatty acids. This flavoring material will be referred to herein, for convenience as "lipase paste." The lipase paste may be prepared as set forth in the patent and the following example is illustrative of its manufacture.

325 pounds of 40% butter-fat cream are heated to a high temperature, say 190° F., for approximately thirty minutes to destroy the bacteria and are then cooled to from 103 to 105° F. Thereafter the cream is inoculated with 151 grams of steapsin dissolved in a small amount of water. The temperature is maintained for a period sufficient for the development of the desired amount of free fatty acids. At the end of twenty-two hours, the cream developed a highly penetrating, accentuated butter-like odor. The lipolyzed cream is then diluted with 50% of its weight in water and heated to 155° F. for thirty minutes to destroy the enzymes and finally cooled. The diluting step may, if desired, be omitted.

In accordance with our invention, the lipase paste may also be produced by cooling the lipolyzed cream immediately after the desired amounts of fatty acids are developed therein, omitting the step of destroying the enzyme. It appears that the presence of the enzyme is not objectionable for the purposes here involved, and that the unheated lipase paste is more desirable for use in margarine manufacture than the material which has been heated for the destruction of the enzymes.

The flavoring material produced in accordance with the aforesaid application Serial No. 223,121 is also derived by lipolysis of a butter-fat-containing material such as whole milk or preferably cream, and has present therein preferentially oil-soluble free fatty acids while being largely free from its preferentially water-soluble free fatty acids resulting from lipolysis. This flavoring material will be referred to herein, for convenience, as "lipase oil." The lipase oil may be prepared as set forth in the aforementioned application and the following example may be deemed illustrative of its production.

325 pounds of 40% butter-fat cream are treated as above described to lipolyze the cream. The lipolyzed cream is then placed in a closed container and heated to a suitable temperature, say about 145° F. to 155° F., for about 30 minutes to destroy the enzyme.

The lipolyzed cream, which is in the form of an emulsion, is then somewhat cooled, to a temperature still above the melting point of butter-fat, say about 125 to 140° F. At about this temperature, it is removed from the container and is centrifuged in a conventional centrifugal oil separator, preferably of a high speed type, to separate the desired oil phase from the undesirable water phase. The oil phase contains about 32.9% of free fatty acids and about .03% of moisture. The water phase contains any undesirable off-flavors, flavors of the steapsin etc., as well as the slight amount of curd present in the cream, along with only about 3% of free fatty acid (calculated as oleic acid). The amount of free fatty acids present in the separated oil can be increased or decreased at will by controlling the extent of lipolysis, either by varying the quantity of enzyme used, the time period during which lipolysis takes place or both, as fully described in the aforementioned application.

The liquid oil phase or lipase oil is substantially moisture-free, has a very clean and characteristic butter-like flavor of highly accentuated character and is used in accordance with our invention as hereinafter described.

In carrying out our invention we incorporate in margarine or other edible emulsion of oleaginous and aqueous substances, the lipolyzed butter fat material, either as lipase paste or lipase oil or a mixture thereof, preferably while avoiding the presence of lactic acid in the margarine or edible emulsion. The oleaginous substances used may be of vegetable or animal origin, or mixed, such as hydrogenated or unhydrogenated cotton seed oil, cocoanut oil, soy bean oil, oleo-stearine, lard and the like. The aqueous substances used may be whole milk, skim milk, aqueous dispersions of whole or skim milk powders, plain water, brine or the like. The lipase paste or lipase oil or mixtures thereof may be directly incorporated into the oleaginous substance or aqueous medium or the milk powders; or, if desired, they may be incorporated or blended into the margarine or other edible emulsion free from lactic acid in any desired known manner, preferably during the emulsification of the fat.

The proportionate quantities of the ingredients employed in forming a margarine in accordance with our invention may vary rather widely as desired. Thus the quantities of solids, which include oils or fats or both, milk solids etc. may vary from about 80% upwardly, the lower limit being in general controlled by law, and preferably in the order of about 84% by weight, the balance being water. The lipase paste or lipase oil or mixture thereof are included as solids derived from milk and may vary from about 0.1% to about 0.3% and up to about 1% by weight of the margarine and higher. When a mixture of lipase paste and lipase oil is used, the proportion of the former to the latter may suitably be in the order of about 2:1. Salt, if used, should not be in excess of about 3%; for example, it may be present in a proportion in the order of about 1 to about 2.5%. Larger amounts may be used, but this is not desirable since we have noted that an excess of salt above the limits set forth and in the order of about the usual 3½ to 5%, tends to mask the flavoring of the lipase paste and lipase oil. We have noted that the quantities of lipase paste, lipase oil and the salt used in accordance with our invention depend, at least to some extent, on the oleaginous substances used and the method of emulsification employed in forming the margarine.

The following example illustrates the production of a margarine in accordance with the present invention. It will be understood, however, that the invention is not to be regarded as limited to the specific details thereof, except in so far as included in the accompanying claims.

| | Parts | Percent |
|---|---|---|
| Total fat (such as 110° melting point hydrogenated cottonseed oil) | 363 | 81 |
| Total milk solids (not fat) provided as milk powder, milk, or the like | 7 | 1.5 |
| Total water (including water from milk) | 72 | 16.1 |
| Salt | 5 | 1.2 |
| Lipase paste | 0.6 | 0.14 |
| Lipase oil | 0.25 | 0.06 |

The hydrogenated cottonseed oil, milk or milk solids and water are emulsified and crystallized in any of the known ways and the other ingredients are then worked or blended into the crystallized emulsion to produce the final margarine product. The lipase paste and lipase oil, alone or together with salt, color or other ingredients, if used, are preferably incorporated directly into the oil and milk in the emulsifying step and the emulsion then worked in any of the usual ways to produce the final margarine product. As stated above, the lipase paste and lipase oil or either of them may be preliminarily introduced into the ingredients constituting the oil phase or the ingredients constituting the liquid phase or both, as desired. The salt, if used, may be worked into the margarine in the blenders, or it may be dissolved in water and emulsified directly with the other ingredients.

The margarine produced in accordance with our invention is of uniform consistency and has a truly characteristic and pronounced butter-flavor and aroma. It is further characterized in that it suffers substantially no loss or change in aroma or flavor on standing or after prolonged storage.

In accordance with our invention we have prepared lactic acid-free or "cultured" milk-free margarines having present therein, as the butter-flavoring, lipase paste or lipase oil singly. However, we prefer the combination of these two flavorings as described above since the combination imparts to margarines certain desired properties of aroma and flavor which are not attainable by the use of either of these flavorings alone.

The expression "lipolyzed butter-fat-containing material" as set forth in the specification and claims, not only includes the flavorings produced as above described and as in Patent No. 1,966,460 and in application No. 223,121, but also the flavoring resulting from an emulsifying or homogenizing treatment of raw cream or raw whole milk in the presence of the natural enzyme lipase. This latter treatment to obtain the flavoring may suitably be carried out in the presence of some preservative, such as salt or sugar, to keep down bacterial and other undesirable growth.

We claim:
1. As an article of manufacture, lactic acid-free margarine having therein a flavoring comprising a lipolyzed butter-fat-containing material having present therein all of the fatty acids developed during lipolysis and a second flavoring comprising a lipolyzed butter-fat-containing material having present therein its preferentially oil-soluble free fatty acids and being largely free from its preferentially water-soluble free fatty acids.

2. As a new article of manufacture, lactic acid-free margarine having present therein a lower than normal percentage of salt and containing a flavoring comprising a lipolyzed butter-fat-containing material having present therein all of the fatty acids developed during lipolysis and a second flavoring comprising a lipolyzed butter-fat-containing material having present therein its preferentially oil-soluble free fatty acids and being largely free from its preferentially water-soluble free fatty acids.

3. As a new article of manufacture, the margarine set forth in claim 1 wherein the first named flavoring is present in an amount greater than the second-named flavoring.

4. As a new article of manufacture, margarine having a reduced amount of lactic acid and less than normal amounts of salt, said margarine comprising an oleaginous substance, milk solids and a flavoring comprising a lipolyzed butter-fat-containing material containing all of the fatty acids developed during lipolysis and a second flavoring comprising a lipolyzed butter-fat-containing material containing its preferentially oil-soluble free fatty acids and being largely free from its preferentially water-soluble free fatty acids.

5. As a new article of manufacture, margarine having a reduced amount of lactic acid and less than normal amounts of salt, said margarine comprising hydrogenated cottonseed oil, milk solids and a flavoring comprising a lipolyzed butter-fat-containing material containing all of the fatty acids developed during lipolysis and a second butter-flavoring comprising a lipolyzed butter-fat-containing material containing its preferentially oil-soluble free fatty acids and being largely free from its preferentially water-soluble free fatty acids.

6. As a new article of manufacture, lactic acid-free margarine having therein a flavoring comprising a lipolyzed butter-fat-containing material having present therein all of the fatty acids developed during lipolysis.

7. As a new article of manufacture, lactic acid-free margarine having therein a butter-flavoring comprising a lipolyzed butter-fat-containing material having present therein its preferentially oil-soluble free fatty acids and being largely free from its preferentially water-soluble free fatty acids.

8. As a new article of manufacture, lactic acid free margarine having therein a flavoring comprising a lipolyzed butter-fat-containing material.

9. As a new article of manufacture, margarine having a reduced amount of lactic acid and less than normal amounts of salt and containing a flavoring comprising a lipolyzed butter-fat-containing material having present therein all of the fatty acids developed during lipolysis and a second flavoring comprising a lipolyzed butter-fat-containing material having present therein its preferentially oil-soluble free fatty acids and being largely free from its preferentially water-soluble free fatty acids.

10. As a new article of manufacture, margarine comprising unacidified milk solids and containing a flavoring comprising a lipolyzed butter-fat-containing material having present therein all of the fatty acids developed during lipolysis and a second flavoring comprising a lipolyzed butter-fat-containing material having present therein its preferentially oil-soluble free fatty acids and being largely free from its preferentially water-soluble free fatty acids.

11. As a new article of manufacture, margarine comprising unacidified milk solids and containing a lipolyzed butter-fat-containing flavoring material.

12. As a new article of manufacture, margarine having a reduced amount of lactic acid and less than normal amounts of salt and containing a flavoring comprising a lipolyzed butter-fat-containing material having present therein all of the fatty acids developed during lipolysis.

13. As a new article of manufacture, margarine having a reduced amount of lactic acid and less than normal amounts of salt and containing a butter-flavoring comprising a lipolyzed butter-fat-containing material having present therein its preferentially oil-soluble free fatty acids and being largely free from its preferential water-soluble free fatty acids.

HERBERT E. OTTING.
LEWIS H. CHRYSLER.